(12) United States Patent
Yu et al.

(10) Patent No.: US 12,076,901 B2
(45) Date of Patent: Sep. 3, 2024

(54) STABILIZED ADAPTIVE HYDRAULIC SYSTEM PRESSURE IN AN INJECTION MOLDING SYSTEM

(71) Applicant: Husky Injection Molding Systems Ltd., Bolton (CA)

(72) Inventors: Weichun Yu, Bolton (CA); Gregory Allan Schultz, Bolton (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 18/144,421

(22) Filed: May 8, 2023

(65) Prior Publication Data

US 2023/0271365 A1 Aug. 31, 2023

Related U.S. Application Data

(63) Continuation of application No. 17/760,931, filed as application No. PCT/CA2020/051261 on Sep. 21, 2020.

(Continued)

(51) Int. Cl.
 *B29C 45/82* (2006.01)
 *B29C 45/76* (2006.01)
 *B29C 45/77* (2006.01)

(52) U.S. Cl.
 CPC .......... *B29C 45/82* (2013.01); *B29C 45/7653* (2013.01); *B29C 45/77* (2013.01);
 (Continued)

(58) Field of Classification Search
 CPC ..... B29C 45/82; B29C 45/7653; B29C 45/77; B29C 2945/76006; B29C 2945/76307;
 (Continued)

(56) References Cited

U.S. PATENT DOCUMENTS

| 4,767,579 A | 8/1988 | Buja et al. |
| 5,210,698 A | 5/1993 | Topmiller |

(Continued)

FOREIGN PATENT DOCUMENTS

| CA | 2990485 A1 | 2/2017 |
| CN | 102001167 A1 | 4/2011 |

(Continued)

OTHER PUBLICATIONS

[No Author Listed], Hylectric 4.0. Husky. Oct. 2016. https://www.husky.co/worlarea/downloadasset.aspx?id=6442451092 [last accessed Mar. 16, 2022], 8 pages.

(Continued)

*Primary Examiner* — Alicia M. Choi
(74) *Attorney, Agent, or Firm* — Wolf, Greenfield & Sacks, P.C.

(57) ABSTRACT

An injection molding system configured to operate in a plurality of cycles includes, amongst other things, a controller that is configured for performing a comparison of a variable pressure setpoint with a target pressure value. The controller is configured to, when the target pressure value is less than the variable pressure setpoint by at least a predetermined lower bound, (i) decrease the variable pressure setpoint to a reduced variable pressure setpoint and (ii) not further decrease the variable pressure setpoint from the reduced variable pressure setpoint until the pump assembly operates for a plurality of stabilizing cycles at the reduced variable pressure setpoint.

23 Claims, 15 Drawing Sheets

Related U.S. Application Data

(60) Provisional application No. 62/910,546, filed on Oct. 4, 2019.

(52) U.S. Cl.
CPC ............... *B29C 2945/76006* (2013.01); *B29C 2945/76307* (2013.01); *B29C 2945/76498* (2013.01); *B29C 2945/76785* (2013.01)

(58) Field of Classification Search
CPC ........... B29C 2945/76498; B29C 2945/76785; B29C 2945/7618; B29C 2945/76381; B29C 2945/76501; B29C 2945/76658; B29C 2945/76859; B29C 2945/76936; B29C 2945/76943

See application file for complete search history.

(56) References Cited

U.S. PATENT DOCUMENTS

| | | | |
|---|---|---|---|
| 5,291,391 A | 3/1994 | Mead et al. | |
| 5,493,503 A | 2/1996 | Richards et al. | |
| 5,513,115 A | 4/1996 | Richards et al. | |
| 5,518,671 A * | 5/1996 | Takizawa | B29C 45/766 |
| | | | 264/40.5 |
| 5,817,258 A | 10/1998 | Ito et al. | |
| 5,997,778 A | 12/1999 | Bulgrin | |
| 6,108,587 A * | 8/2000 | Shearer | B29C 45/82 |
| | | | 700/200 |
| 6,144,182 A | 11/2000 | Totani et al. | |
| 6,289,259 B1 | 9/2001 | Choi et al. | |
| 6,868,305 B2 | 3/2005 | Choi et al. | |
| 6,878,317 B2 | 4/2005 | Kubota | |
| 7,051,526 B2 | 5/2006 | Geiger | |
| 7,121,820 B2 | 10/2006 | Tooman et al. | |
| 7,275,923 B2 | 10/2007 | Tooman et al. | |
| 7,425,123 B2 | 9/2008 | Reinhardt | |
| 7,484,429 B2 * | 2/2009 | Adams | F16H 61/30 |
| | | | 74/335 |
| 7,568,905 B2 | 8/2009 | Cooke | |
| 7,588,436 B2 | 9/2009 | Tooman et al. | |
| 7,845,925 B2 | 12/2010 | Tooman et al. | |
| 7,866,970 B2 | 1/2011 | Hakoda et al. | |
| 8,123,989 B2 | 2/2012 | Notz | |
| 8,168,097 B2 | 5/2012 | Hakoda et al. | |
| 8,192,191 B2 | 6/2012 | Tooman et al. | |
| 9,005,509 B2 | 4/2015 | Galati et al. | |
| 9,011,736 B2 | 4/2015 | de Oliveira Antunes et al. | |
| 9,144,929 B2 | 9/2015 | Tan et al. | |
| 9,280,152 B2 | 3/2016 | Koyana | |
| 9,346,207 B2 | 5/2016 | Yuan | |
| 9,427,905 B2 | 8/2016 | Tan et al. | |
| 9,440,389 B2 | 9/2016 | Galati et al. | |
| 9,492,960 B2 | 11/2016 | Galati | |
| 9,498,909 B2 | 11/2016 | Moss et al. | |
| 9,534,702 B2 | 1/2017 | Schonlau | |
| 9,604,399 B2 | 3/2017 | Yang et al. | |
| 9,623,598 B2 | 4/2017 | Galati et al. | |
| 9,636,858 B2 | 5/2017 | de Oliveira Antunes et al. | |
| 9,662,820 B2 | 5/2017 | Antunes et al. | |
| 9,682,504 B2 | 6/2017 | Tan et al. | |
| 9,682,507 B2 | 6/2017 | Schreyer et al. | |
| 9,724,861 B2 | 8/2017 | Antunes et al. | |
| 9,738,024 B2 | 8/2017 | Antunes et al. | |
| 9,873,219 B2 | 1/2018 | Galati et al. | |
| 9,878,477 B2 | 1/2018 | Moss et al. | |
| 9,937,648 B2 | 4/2018 | Galati | |
| 9,944,006 B2 | 4/2018 | Tan | |
| 9,987,783 B2 | 6/2018 | Tan et al. | |
| 10,005,215 B2 | 6/2018 | Tan et al. | |
| 10,005,216 B2 | 6/2018 | Tan et al. | |
| 10,046,496 B2 | 8/2018 | Tan et al. | |
| 10,046,497 B2 | 8/2018 | Tan et al. | |
| 10,052,801 B2 | 8/2018 | Galati et al. | |
| 10,059,048 B2 | 8/2018 | Schultz | |
| 10,180,135 B2 | 1/2019 | Caldwell et al. | |
| 2006/0293147 A1 * | 12/2006 | Adams | F16H 61/0251 |
| | | | 477/154 |
| 2007/0296102 A1 * | 12/2007 | Hofmann | B29C 45/77 |
| | | | 425/149 |
| 2009/0115086 A1 * | 5/2009 | Manda | B29C 45/74 |
| | | | 264/40.6 |
| 2009/0263530 A1 | 10/2009 | Hakoda et al. | |
| 2010/0001439 A1 * | 1/2010 | Bock | B29C 49/6427 |
| | | | 264/528 |
| 2010/0132668 A1 * | 6/2010 | Borchsenius | F02D 41/3872 |
| | | | 123/456 |
| 2011/0046771 A1 * | 2/2011 | Alms | B29C 70/546 |
| | | | 700/114 |
| 2012/0204965 A1 * | 8/2012 | Loldj | F04D 19/04 |
| | | | 137/14 |
| 2014/0224829 A1 | 8/2014 | Capone et al. | |
| 2014/0264991 A1 | 9/2014 | Hwang et al. | |
| 2015/0037448 A1 * | 2/2015 | Schultz | B29C 45/7626 |
| | | | 425/162 |
| 2015/0152805 A1 * | 6/2015 | Song | F02D 41/3082 |
| | | | 361/820 |
| 2016/0279701 A1 * | 9/2016 | Tomioka | B22D 17/2015 |
| 2017/0157824 A1 | 6/2017 | Ward et al. | |
| 2017/0217066 A1 | 8/2017 | Galati et al. | |
| 2018/0021992 A1 | 1/2018 | Moss | |
| 2018/0022002 A1 | 1/2018 | Moss | |
| 2018/0272587 A1 | 9/2018 | Galati et al. | |
| 2019/0278261 A1 * | 9/2019 | Shibuya | G05B 23/0283 |
| 2019/0337209 A1 * | 11/2019 | Collins | B29C 45/77 |
| 2019/0346058 A1 | 11/2019 | Murison | |
| 2020/0086542 A1 * | 3/2020 | Collins | B29C 45/77 |
| 2020/0406521 A1 * | 12/2020 | Altonen | B29C 45/766 |
| 2022/0332029 A1 * | 10/2022 | Altonen | B29C 45/766 |
| 2022/0332030 A1 | 10/2022 | Yu et al. | |
| 2023/0302704 A1 | 9/2023 | Yu et al. | |

FOREIGN PATENT DOCUMENTS

| | | | | |
|---|---|---|---|---|
| EP | | 1321276 A1 * | 6/2003 | ............ B29C 45/82 |
| EP | | 1 403 528 A1 | 3/2004 | |
| EP | | 2 769 821 A1 | 8/2014 | |
| JP | | H10-086204 A1 | 4/1998 | |
| WO | | 2010/144993 A1 | 12/2010 | |

OTHER PUBLICATIONS

Extended European Search Report for European Application No. 20870959.2, dated Dec. 19, 2023.

Extended European Search Report for European Application No. 231989662.1, dated Dec. 21, 2023.

* cited by examiner

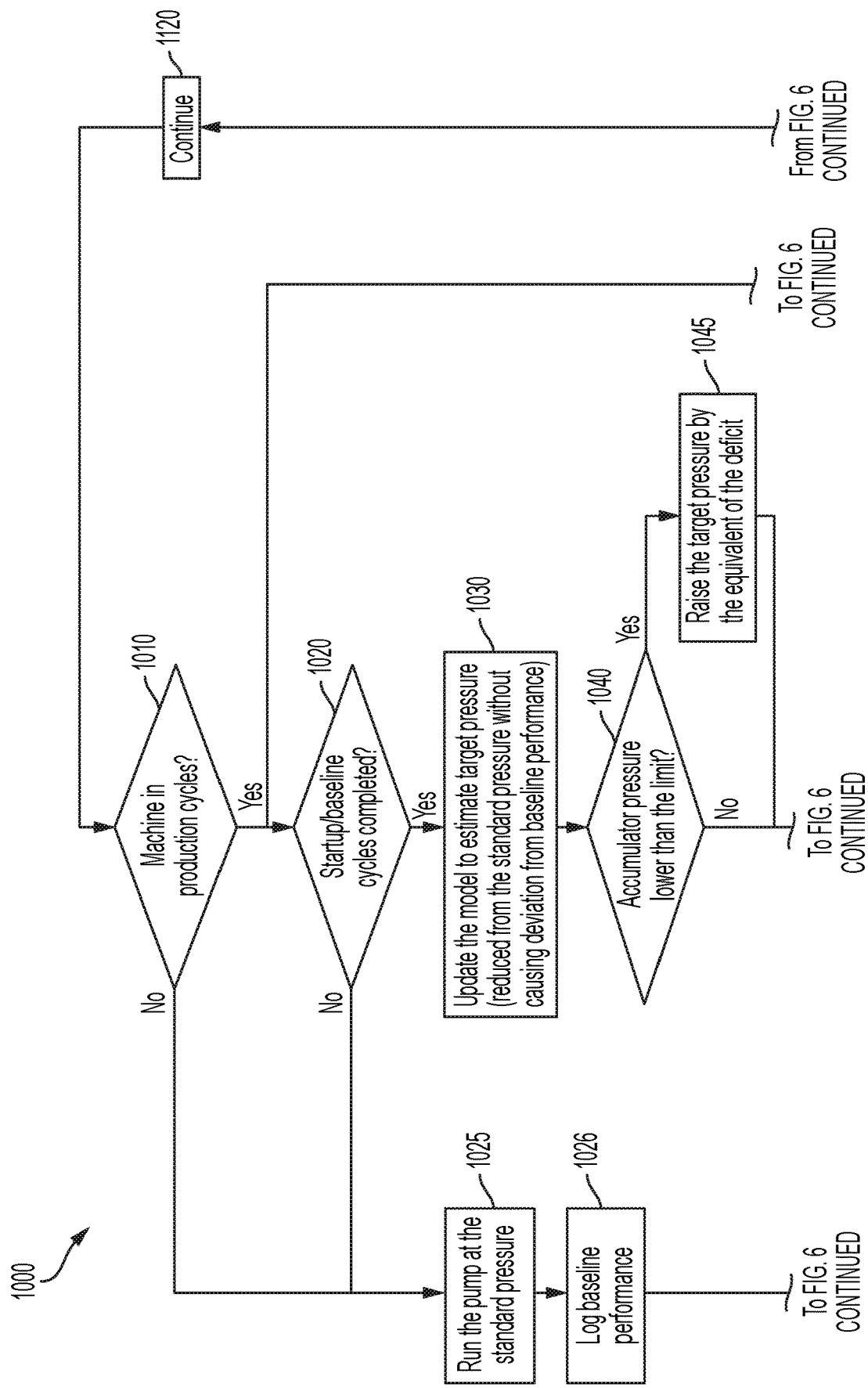

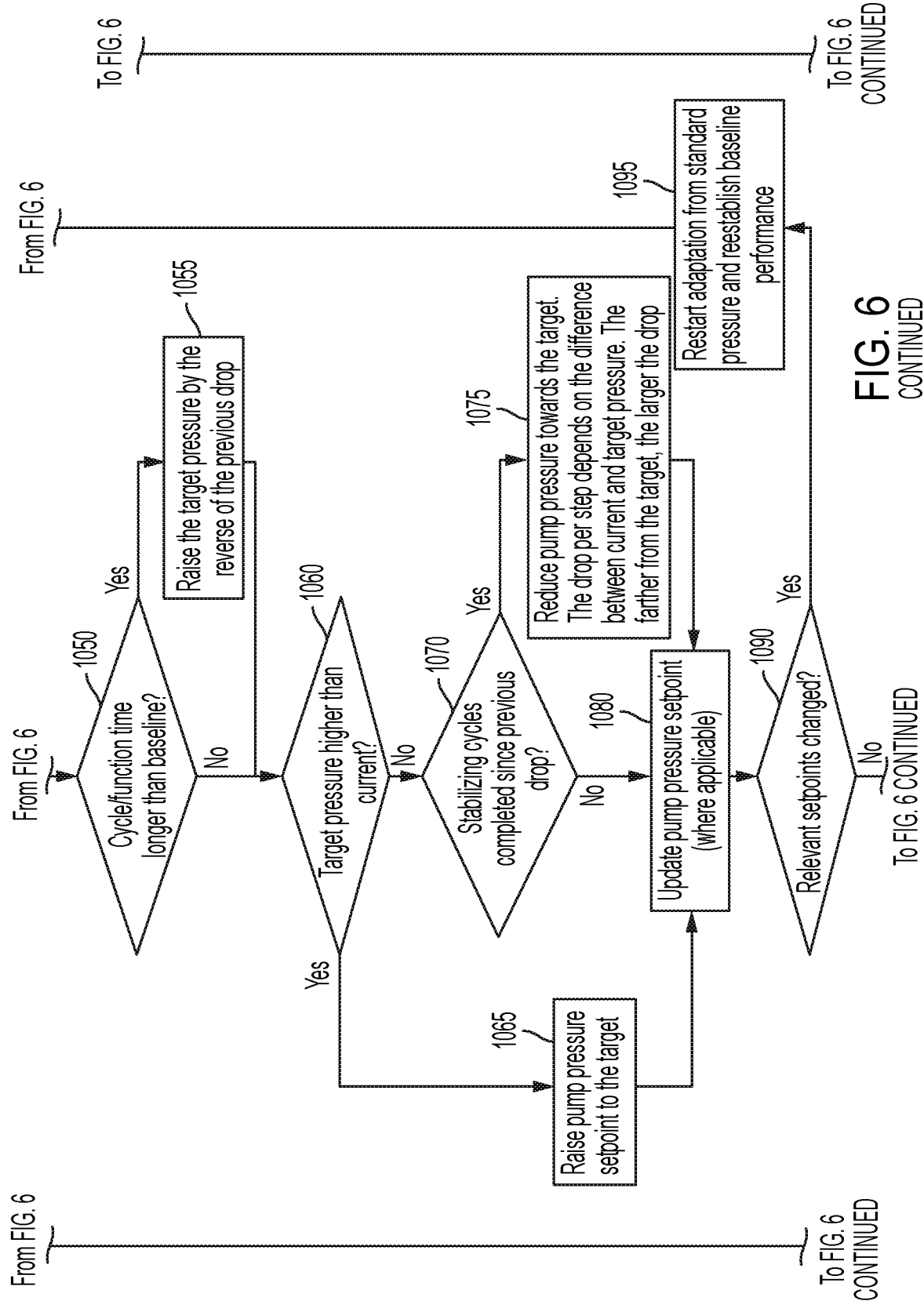

STABILIZED ADAPTIVE HYDRAULIC SYSTEM PRESSURE IN AN INJECTION MOLDING SYSTEM

CROSS-REFERENCE TO RELATED APPLICATIONS

This application claims the benefit under 35 U.S.C. § 120 as a continuation of U.S. patent application Ser. No. 17/760,931, titled "STABILIZED ADAPTIVE HYDRAULIC SYSTEM PRESSURE IN AN INJECTION MOLDING SYSTEM," filed Mar. 16, 2022 which is a national stage filing under 35 U.S.C. § 371 of International Application Serial No. PCT/CA2020/051261, filed Sep. 21, 2020, entitled "STABILIZED ADAPTIVE HYDRAULIC SYSTEM PRESSURE IN AN INJECTION MOLDING SYSTEM," which claims the benefit under 35 U.S.C. § 119(e) to U.S. Provisional Application Ser. No. 62/910,546, filed Oct. 4, 2019. The entirety of each of which is incorporated herein in its entirety.

BACKGROUND

In hydraulic systems, including, for example, an injection molding system, it is desirable to minimize the consumption of energy. The energy consumed in a hydraulic system is a function of various characteristics of the system, such that altering one or more of these characteristics will alter the energy consumed.

Specifically, it is well known that the power required by a hydraulic system can be defined as the hydraulic fluid pressure times its volumetric flow rate. The volumetric flow rate, in turn, can be defined as the hydraulic fluid flow cross-sectional area times the flow velocity.

In an injection molding system, the flow rate inputs of flow cross-sectional area and flow velocity (in other words, size and speed) correspond to those properties of the actuator. Thus, an injection molding system's hydraulic power can be defined as the system pressure times the actuator cross-sectional area times the actuator speed. In order to reduce the consumption of energy, one or more of these three parameters—system pressure, actuator area, and actuator speed—must be reduced. Because an injection molding system has fixed actuator sizes, it is not feasible to reduce their size during operation of the injection molding system. And while the actuator speed can be reduced, this is not desirable because actuator speed and system output are directly correlated, so reducing speed would reduce output.

Thus, to reduce energy consumption while maintaining output, the most feasible option is to reduce system pressure. FIG. 1 is a graph that illustrates the relationship between system pressure, energy, and output in injection molding systems generally. As system pressure is reduced in an injection molding system, the specific energy consumed at a given quantity of output is also reduced. A hydraulic system may be designed to operate over a number of process cycles, and various functions may take place during each cycle. In an injection molding system, these functions may relate to, at a high level, clamping of the mold, injection of plastic material, cooling of the injected plastic, and ejection of the molded part. More specifically, such functions may include, for example, and among others, mold closing, clamp-up, injection fill, injection hold, unclamp, mold opening, ejector-forward, ejector-back, transfer, packing, and carriage. These functions have different pressure requirements, so within an injection molding system cycle, the pressure necessary to perform these functions may have largely fluctuating values. For a given function, the required pressure may also vary at different components of the injection molding system—for example, the pressures at the pump(s), accumulator(s), clamp supply, and injection supply may have different values. In order for the injection molding system to operate, its system pressure must have a value at least as great as the greatest required value of component pressure in a cycle. However, to the extent the system pressure is greater than the greatest required value of component pressure, this surplus represents excess energy that was unnecessarily consumed. FIGS. 2A and 2B are graphs that illustrate this surplus in system pressure for injection supply in an injection molding system. The system pressure is reduced in this example from 220 bar in FIG. 2A to 190 bar in FIG. 2B, reducing the surplus system pressure over the peak component pressure, and thereby reducing the energy consumed by the system.

Examples of known injection molding systems and components thereof are disclosed in WO 2010/144993 and US 2015/0037448 A1, including via additional references disclosed therein.

SUMMARY OF THE INVENTION

In one aspect of the present invention, there is provided an injection molding system configured to operate in a plurality of cycles. The system comprises a pump assembly, a proportional pump control valve operatively connected to the pump assembly, a sensor and a controller. The proportional pump control valve is configured to provide a variable pressure setpoint of the injection molding system equal to a magnitude of pressure of hydraulic fluid within the proportional pump control valve. The sensor is configured to detect the magnitude of pressure hydraulic fluid within the proportional pump control valve and to send a signal to the controller representative of the variable pressure setpoint. The controller is configured to control a flowrate of hydraulic fluid flowing out of the proportional pump control valve. The variable pressure setpoint is configured to change based on the flowrate of hydraulic fluid flowing out of the proportional pump control valve. The controller is configured to perform a comparison of the variable pressure setpoint with a target pressure value. Upon performing the comparison of the variable pressure setpoint with the target pressure value, the controller is configured to, when the target pressure value is less than the variable pressure setpoint by at least a predetermined lower bound, (i) decrease the variable pressure setpoint to a reduced variable pressure setpoint and (ii) not further decrease the variable pressure setpoint from the reduced variable pressure setpoint until the pump assembly operates for a plurality of stabilizing cycles at the reduced variable pressure setpoint.

Other aspects and features of the present invention are identified in the claims.

Other aspects and features of the non-limiting embodiments may now become apparent to those skilled in the art upon review of the following detailed description of the non-limiting embodiments with the accompanying drawings.

DETAILED DESCRIPTIONS OF THE DRAWINGS

The non-limiting embodiments may be more fully appreciated by reference to the following detailed descriptions of the non-limiting embodiments, when taken in conjunction with the accompanying drawings, in which.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE
NON-LIMITING EMBODIMENTS

The present invention is related to a hydraulic system. In specific embodiments of the invention described below, the hydraulic system is used as part of an injection molding system. However, those skilled in the art will recognize that the hydraulic system could be used in systems other than an injection molding system.

Figure 1:
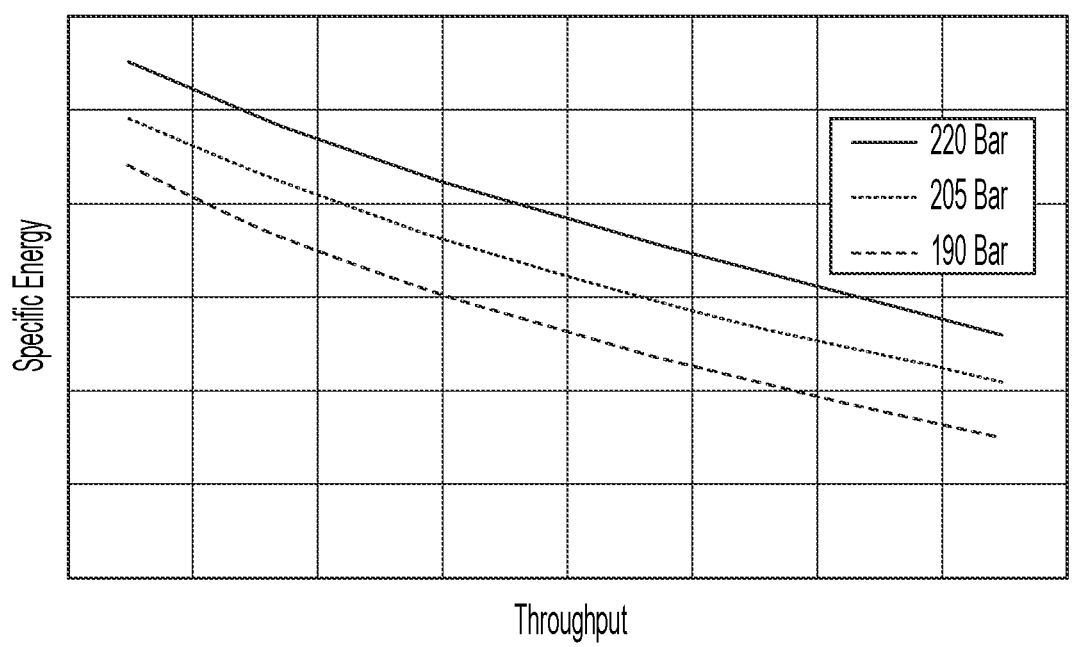
FIG. 1 depicts a graph showing specific energy as a function of system pressure and output.
Figure 2A:
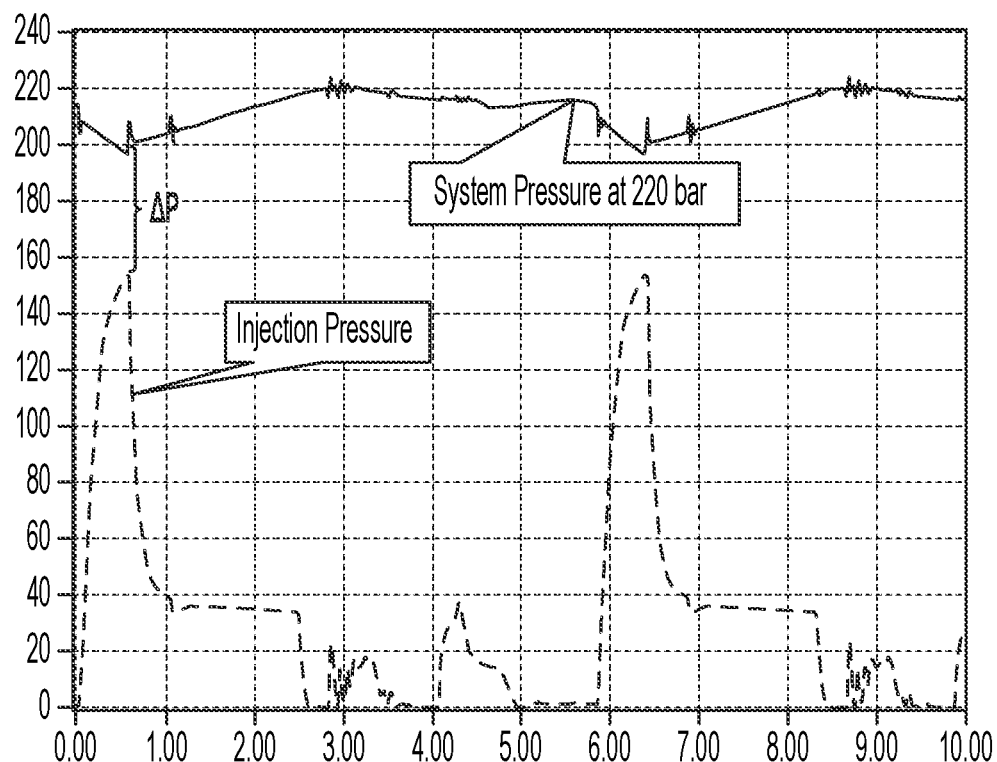
FIG. 2A depicts a graph showing injection pressure and system pressure over time.
Figure 2B:
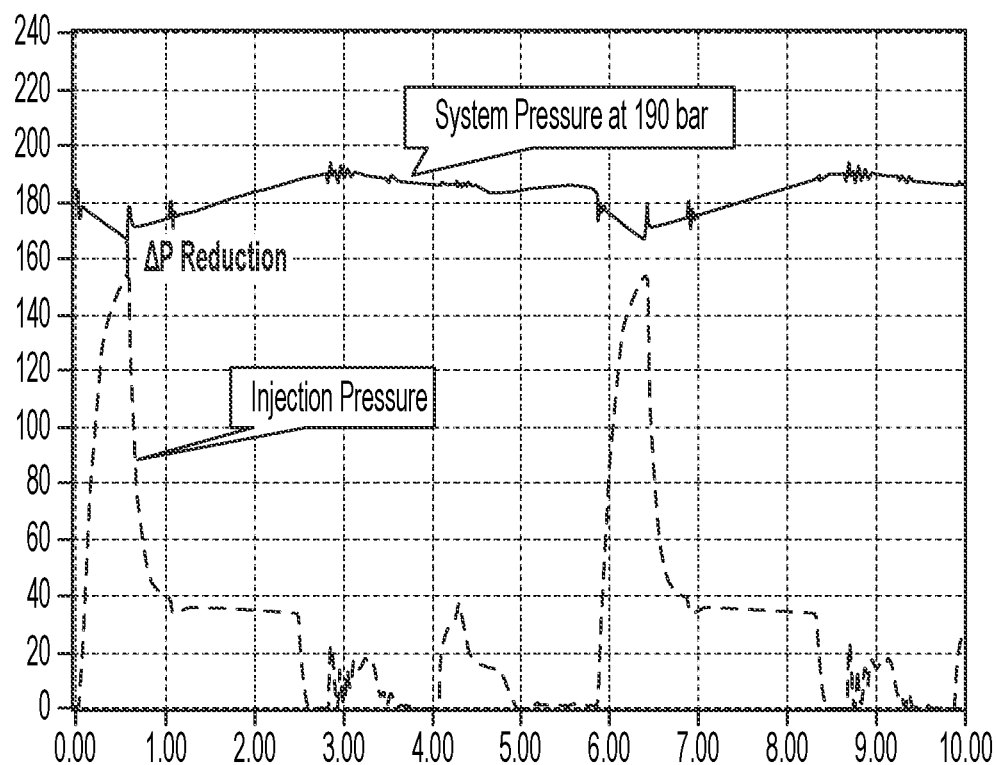
FIG. 2B depicts a graph showing injection pressure and a lower system pressure over time.
Figure 3:
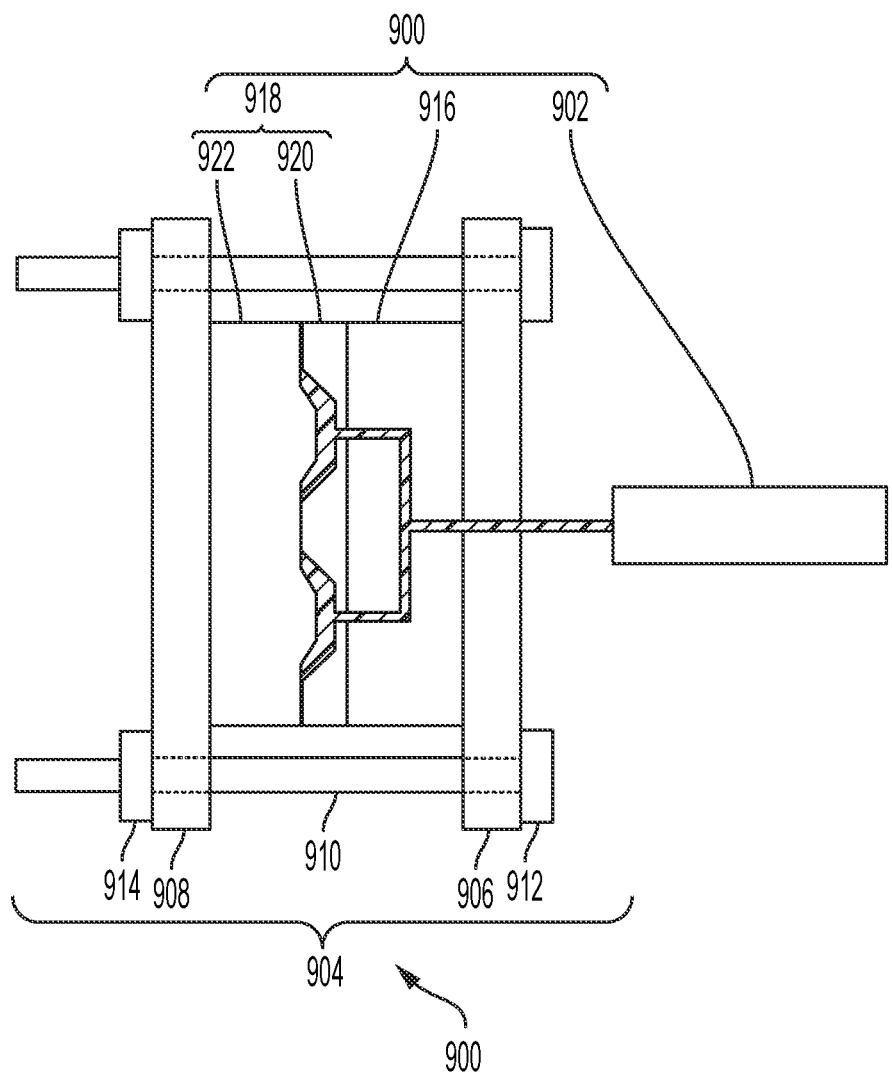
FIG. 3 depicts an example of an injection molding system.

Referring now to FIG. 3, an example of an injection molding system 900 is shown. The molding system 900 is configured to support and to use a hydraulic circuit of the present invention, including the examples of FIGS. 4 and 5. Other aspects and components of the injection molding system 900 may be known and may include those disclosed in WO 2010/144993 and US 2015/0037448 A1, including the references disclosed therein. For example, aspects of the injection molding system 900 depicted in FIG. 3 are described in US 2015/0037448 A1. According to the example of FIG. 3, the injection molding system 900 includes (and is not limited to) an extruder assembly, a clamp assembly, a runner system, and/or a mold assembly 918. By way of example, the extruder assembly 902 is configured to prepare, in use, a heated, flowable resin, and is also configured to inject or to move the resin from the extruder assembly 902 toward the runner system 916. Other names for the extruder assembly 902 may include "injection unit," "melt-preparation assembly," etc. By way of example, the clamp assembly 904 includes (and is not limited to): a stationary platen 906, a movable platen 908, a rod assembly 910, a clamping assembly 912, and/or a lock assembly 914. The stationary platen 906 does not move; that is, the stationary platen 906 may be fixedly positioned relative to the ground or floor. The movable platen 908 is configured to be movable relative to the stationary platen 906. A platen-moving mechanism (not depicted but known) is connected to the movable platen 908, and the platen-moving mechanism is configured to move, in use, the movable platen 908. The rod assembly 910 extends between the movable platen 908 and the stationary platen 906. The rod assembly 910 may have, by way of example, four rod structures positioned at the corners of the respective stationary platen 906 and the movable platen 908. The rod assembly 910 is configured to link the movable platen 908 to the stationary platen 906. A clamping assembly 912 is connected to the rod assembly 910. The stationary platen 906 is configured to support (or configured to position) the position of the clamping assembly 912. The lock assembly 914 is connected to the rod assembly 910, or may alternatively be connected to the movable platen 908. The lock assembly 914 is configured to selectively lock and unlock the rod assembly 910 relative to the movable platen 908. By way of example, the runner system 916 is attached to, or is supported by, the stationary platen 906. The runner system 916 is configured to receive the resin from the extruder assembly 902. By way of example, the mold assembly 918 includes (and is not limited to): a mold-cavity assembly 920 and a mold-core assembly 922 that is movable relative to the mold-cavity assembly 920. The mold-core assembly 922 is attached to or supported by the movable platen 908. The mold-cavity assembly 920 is attached to or supported by the runner system 916, so that the mold-core assembly 922 faces the mold-cavity assembly 920. The runner system 916 is configured to distribute the resin from the extruder assembly 902 to the mold assembly 918.

In operation, the movable platen 908 is moved toward the stationary platen 906 so that the mold-cavity assembly 920 is closed against the mold-core assembly 922, so that the mold assembly 918 may define a mold cavity configured to receive the resin from the runner system 916. The lock assembly 914 is engaged so as to lock the position of the movable platen 908 so that the movable platen 908 no longer moves relative to the stationary platen 906. The clamping assembly 912 is then engaged to apply a clamping pressure, in use, to the rod assembly 910, so that the clamping pressure then may be transferred to the mold assembly 918. The extruder assembly 902 pushes or injects, in use, the resin to the runner system 916, which then the runner system 916 distributes the resin to the mold cavity structure defined by the mold assembly 918. Once the resin in the mold assembly 918 is solidified, the clamping assembly 912 is deactivated so as to remove the clamping force from the mold assembly 918, and then the lock assembly 914 is deactivated to permit movement of the movable platen 908 away from the stationary platen 906, and then a molded article may be removed from the mold assembly 918.

It will be appreciated that the injection molding system 900 may include more than two platens. According to an example, the injection molding system 900 includes (and is not limited to) a third platen (not depicted), which is also called a "clamping platen" that is known in the art and thus is not described here in greater detail.

Figure 4:
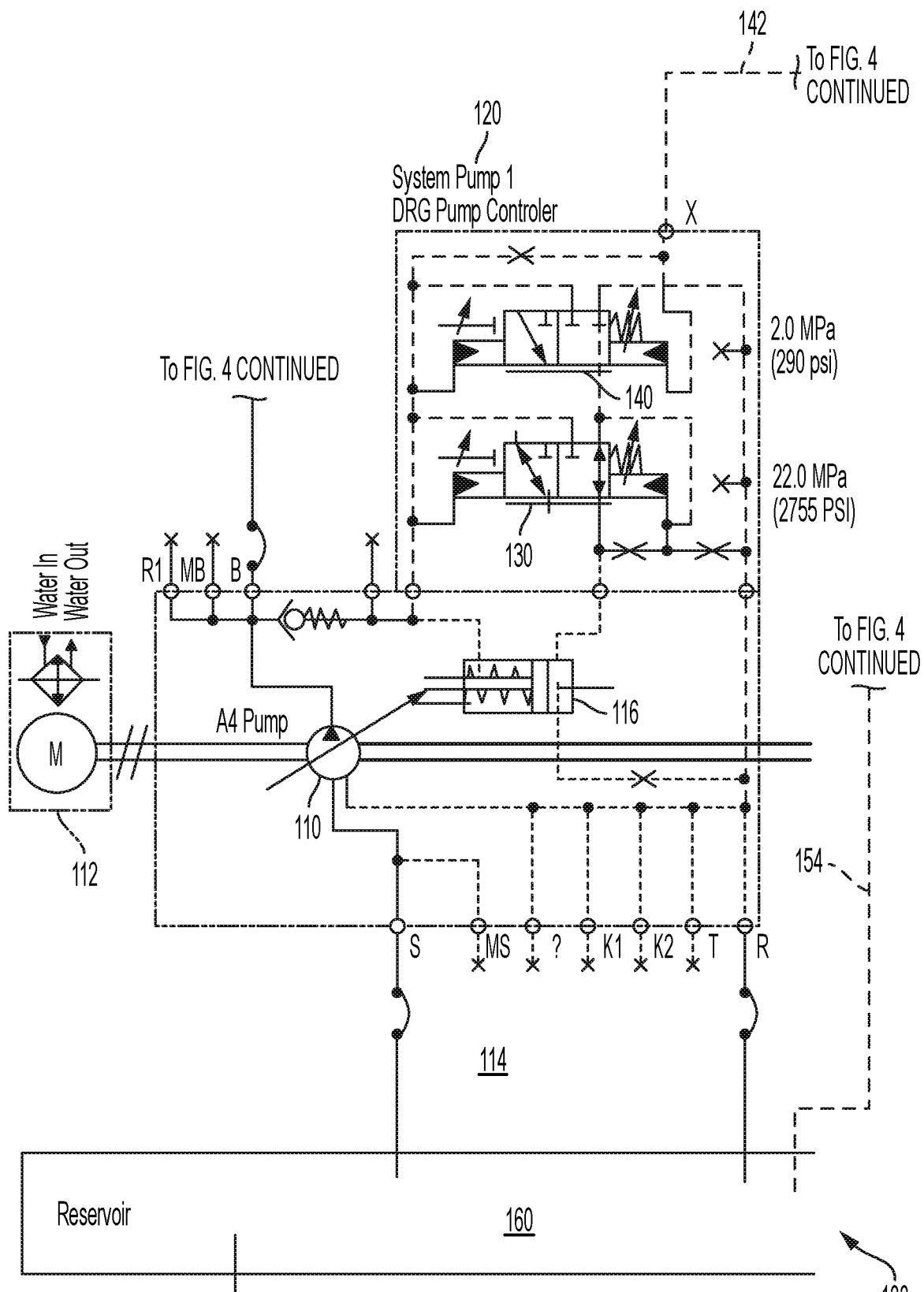
FIG. 4 depicts a first example of a hydraulic circuit.
Figure 4:
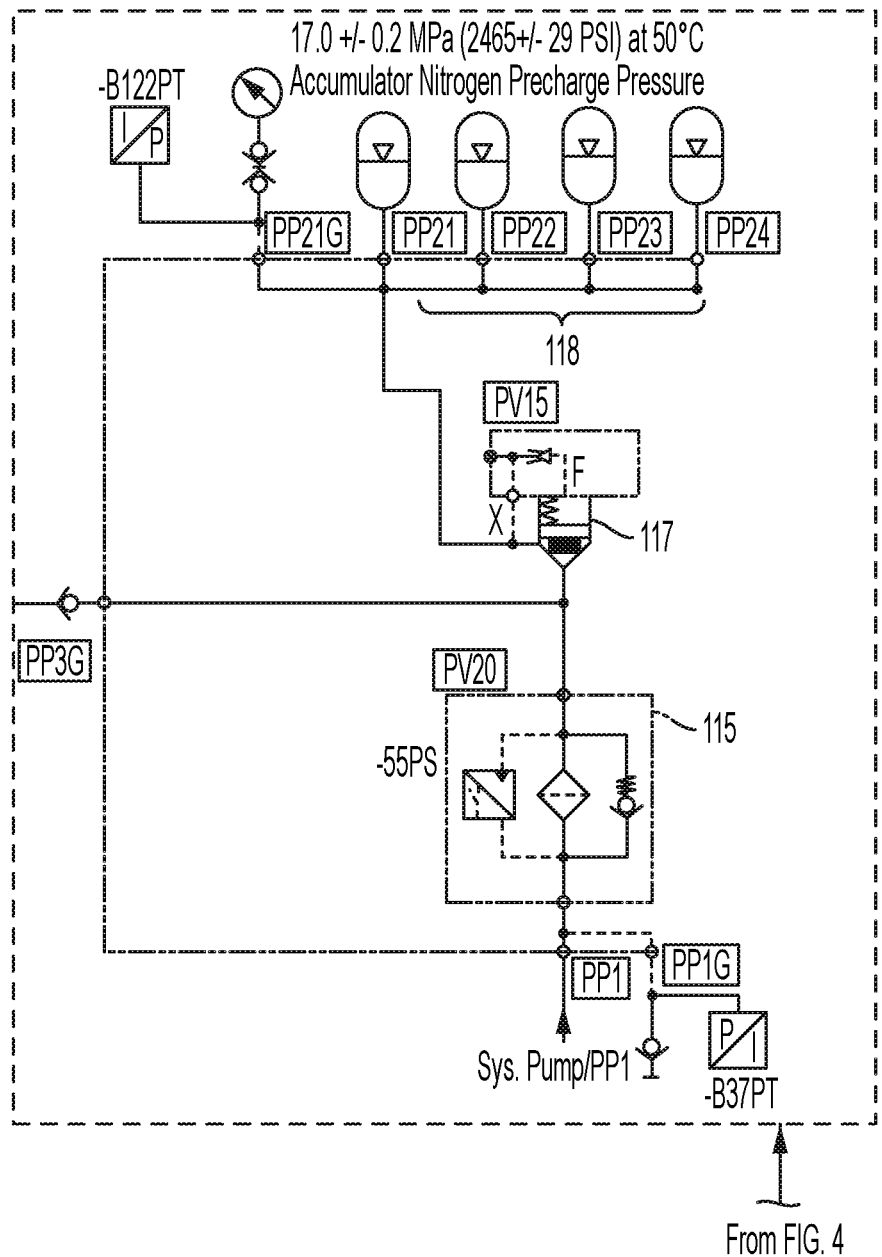
Figure 4:
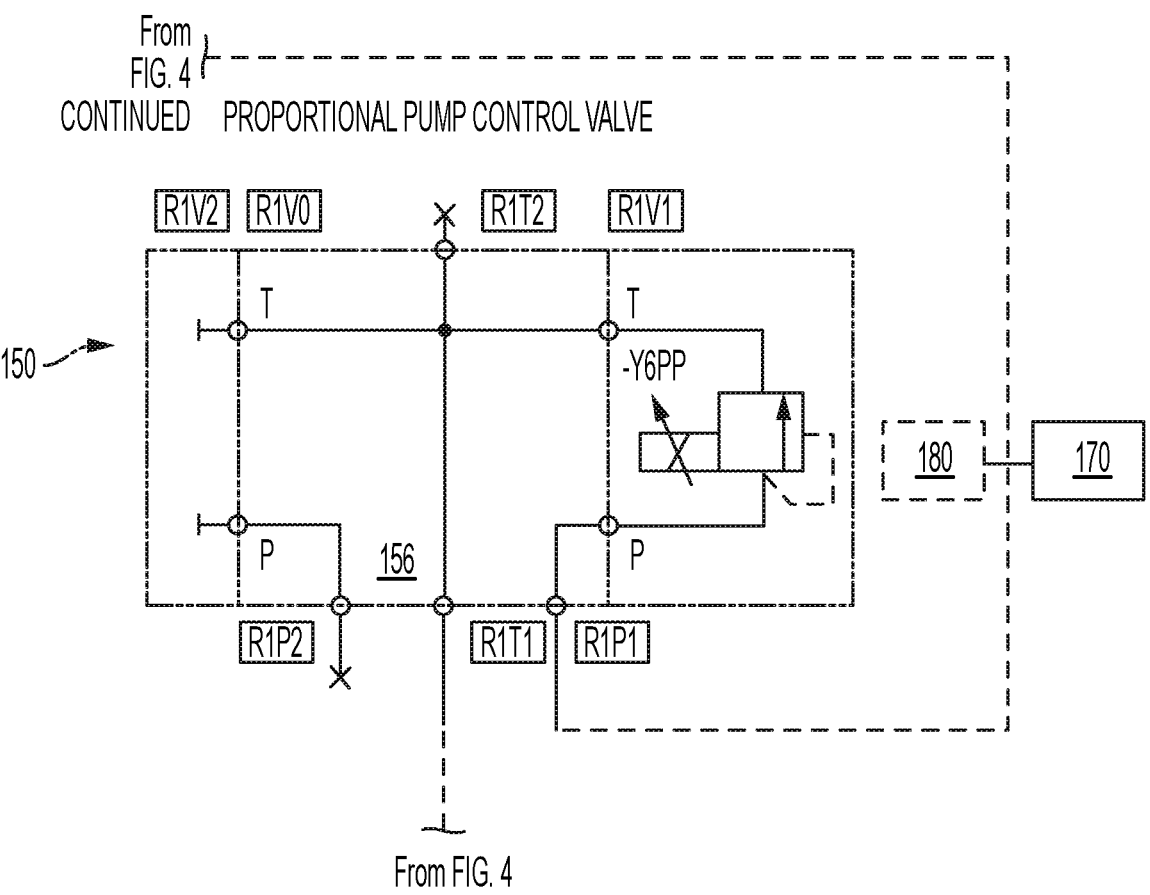

Referring now to FIG. 4, a schematic for a hydraulic circuit is shown at 100. The hydraulic circuit 100 is configured to actuate one or more functions of the injection molding system 900, for example, mold closing, clamp-up, injection fill. According to the example of FIG. 4, the hydraulic circuit 100 includes a pump assembly 110, a motor assembly 112, a pump actuator assembly 116, a hydraulic fluid filter 115, an accumulator check valve 117, one or more accumulator assemblies 118, a pump compensator valve assembly 120, a proportional pump control valve 150, a reservoir 160, and a controller 170.

The pump assembly 110 is configured to pump hydraulic fluid from the reservoir 160 to other components of the hydraulic circuit 100. In the presently illustrated embodiment, the pump assembly 110 is a variable displacement piston pump, although it is not particularly limited and can include both fixed and variable displacement pumps, as is known to those skilled in the art. The pump assembly 110 is operatively connected to motor assembly 112, to the reservoir 160, and to one or more accumulator assemblies 118. The pump assembly 110 is also operatively connected to, and configured to be controlled by a valve. For example, 150

Control Valve is configured to control the pump assembly 110 by changing its displacement. Alternatively if so equipped the pump can be controlled with a variable speed motor, the RPM can be controlled, or both RPM and displacement can be controlled.

The motor assembly 112 is configured to actuate movement of the pump assembly 110. In the presently illustrated embodiment, the motor assembly 112 is a fixed-RPM motor, although it is not particularly limited and can include variable RPM motors or servo motors. The motor assembly 112 is operatively connected to, and configured to be controlled by, the drive. For example, the servo drive or variable frequency drive is configured to control the motor assembly 120 by changing its rpm, or torque limits.

The one or more accumulator assemblies 118 are configured to store hydraulic fluid under pressure generated by the pump assembly 110. The one or more accumulator assemblies 118 are operatively connected to the pump assembly 110 via the accumulator check valve 117 and the hydraulic fluid filter 115. The accumulator check valve 117 is configured to prevent the one or more accumulator assemblies 118 from discharging through the hydraulic fluid filter 115 and the pump assembly 110 while the motor assembly 112 is not in operation. The hydraulic fluid filter 115 is configured to filter the hydraulic fluid flowing to one or more accumulator assemblies 118.

The pump compensator valve assembly 120 is configured to control the flow of hydraulic fluid to the actuator assembly 116 and to the proportional pump control valve 150 while the hydraulic fluid pressure has a value that is outside of preset setpoints. The pump compensator valve assembly 120 is operatively connected to the pump assembly 110, to the actuator assembly 116, and to the proportional pump control valve 150. The pump compensator valve assembly 120 includes a maximum pump compensator valve 130 and a minimum pump compensator valve 140. The maximum pump compensator valve 130 is configured to provide a preset maximum pressure setpoint of the injection molding system 900, and the minimum pump compensator valve 140 is configured to provide a preset minimum pressure setpoint of the injection molding system 900. In an example embodiment, the preset maximum pressure setpoint is 230 bar and the preset minimum pressure setpoint is 20 bar. In an example embodiment, each of the maximum pump compensator valve 130 and the minimum pump compensator valve 140 includes a set screw that is configured to be adjusted prior to operation of the injection molding system 900; adjustment of the set screw changes the value of the spring force applied by the corresponding pump compensator valve and thus its preset pressure setpoint. The pump assembly 110 is configured to destroke when the hydraulic fluid pressure reaches the preset maximum pressure setpoint, such that this pressure value is maintained. In particular, when the system pressure (i) is below the minimum the valve 140 directs flow to the reservoir 160 through control valve 150, causing the pump to go to maximum displacement, (ii) crosses the minimum threshold, (iii) crosses the maximum threshold, and (iv) is above the maximum the valve 130 blocks flow to the reservoir 160 and through control valve 150, causing the pump to go to minimum displacement.

The actuator assembly 116 is configured to impart a force to the pumps internal swashplate. The force is used, for example, to change the displacement of the pump assembly 110.

The proportional pump control valve 150 is configured to provide a variable pressure setpoint of the injection molding system 900, within the end limits of valves 130 and 140, and thereby control the system pressure of the injection molding system 900. The proportional pump control valve 150 is operatively connected to the reservoir 160. In the presently illustrated embodiment, the proportional pump control valve 150 is operatively connected to the reservoir 160 via a supply line 154. The proportional pump control valve 150 is operatively connected to a sensor 180. The sensor 180 is configured to detect pressure within the proportional pump control valve 150 and to send a signal representative of the pressure detected by the sensor 180 to the controller 170. In the presently illustrated embodiment, the sensor 180 is a transducer. The proportional pump control valve 150 is operatively connected to, and configured to be controlled by, the controller 170. For example, the controller 170 is configured to send a voltage signal to the proportional pump control valve 150. The proportional pump control valve 150 is configured to, upon receipt of the voltage signal, permit flow of hydraulic fluid to the reservoir 160, and thereby provide a variable pressure setpoint that is lower than the preset maximum pressure setpoint. In an example embodiment, the proportional pump control valve 150 is a variable displacement valve, whereby the voltage signal sent by the controller 170 governs the position of a spool within the proportional pump control valve 150, thereby causing the orifice of the proportional pump control valve 150 to change in size depending on the voltage signal, such that hydraulic fluid flows at changing flowrates—or not at all—along the supply line 154 to the reservoir 160. In this manner, changes in the size of the orifice of the proportional pump control valve 150 change pressure of the hydraulic fluid flowing through the proportional pump control valve 150, thus changing the variable pressure setpoint and ultimately changing the system pressure. The reservoir 160 is configured to be a source of and receptacle for hydraulic fluid. The hydraulic circuit 100 is thus configured to perform the following operation. When the motor assembly 112 operates to actuate movement of the pump assembly 110, the pump assembly 110 pumps hydraulic fluid from the reservoir 160 to the pump compensator valve assembly 120 and in turn to the actuator assembly 116 and the proportional pump control valve 150. The pump assembly 110 also pumps hydraulic fluid to the one or more accumulator assemblies 118. With the presence of the voltage signal from the controller 170 to the proportional pump control valve 150, the hydraulic fluid is restricted or not permitted to flow from the proportional pump control valve 150 to the reservoir 160, and thus flows to the actuator assembly 116. If there is no voltage signal the valve 150 will not restrict the oil flow and the "orifice" will be at maximum size. The pressure in the pump control circuit will decrease. If the minimum pressure setting of control valve 140 is reached, control valve 140 will close or restrict the oil flow into hose 142 diverting flow to actuator 116 in attempt to increase the displacement and increase the pump pressure above the minimum setpoint. As the pump assembly 110 continues to pump hydraulic fluid within the hydraulic circuit 100, the pressure of the hydraulic fluid—corresponding to the system pressure of the injection molding system 900—will continue to increase. In the event of a failure of the proportional pump control valve 150 or the controller 170, the maximum pressure compensator valve 130 governs, and the system pressure will rise until it equals the preset maximum pressure setpoint. In normal operation, the proportional pump control valve 150 governs, and the system pressure will rise until it equals the variable pressure setpoint, as determined based on the voltage signal sent by the controller 170. Depending on one or more system parameters, the voltage signal will change during operation, resulting in corresponding changes to the variable pressure setpoint and hence achieving adaptive system pressure.

Figure 5:
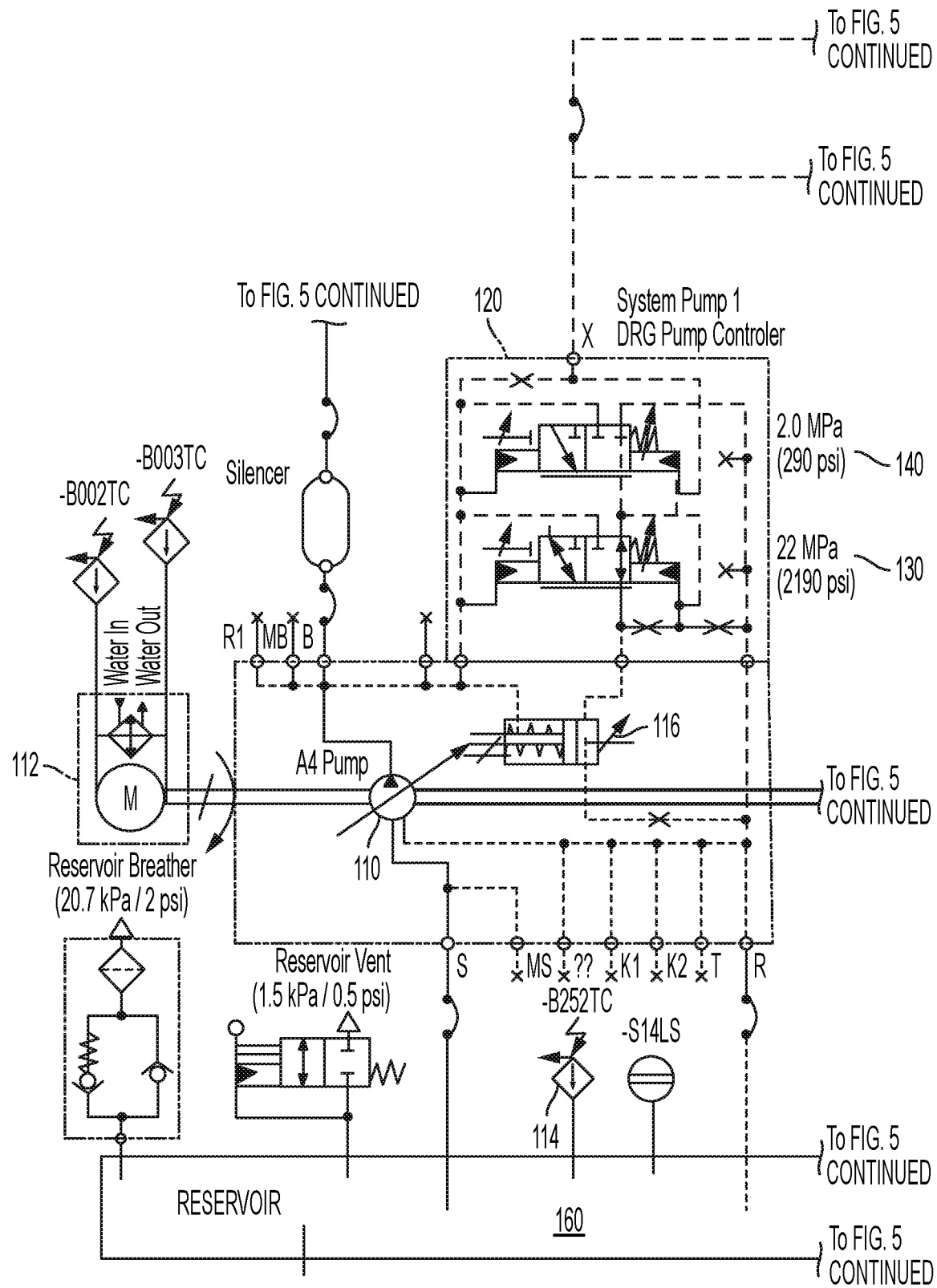
FIG. 5 depicts a second example of a hydraulic circuit.
Figure 5:
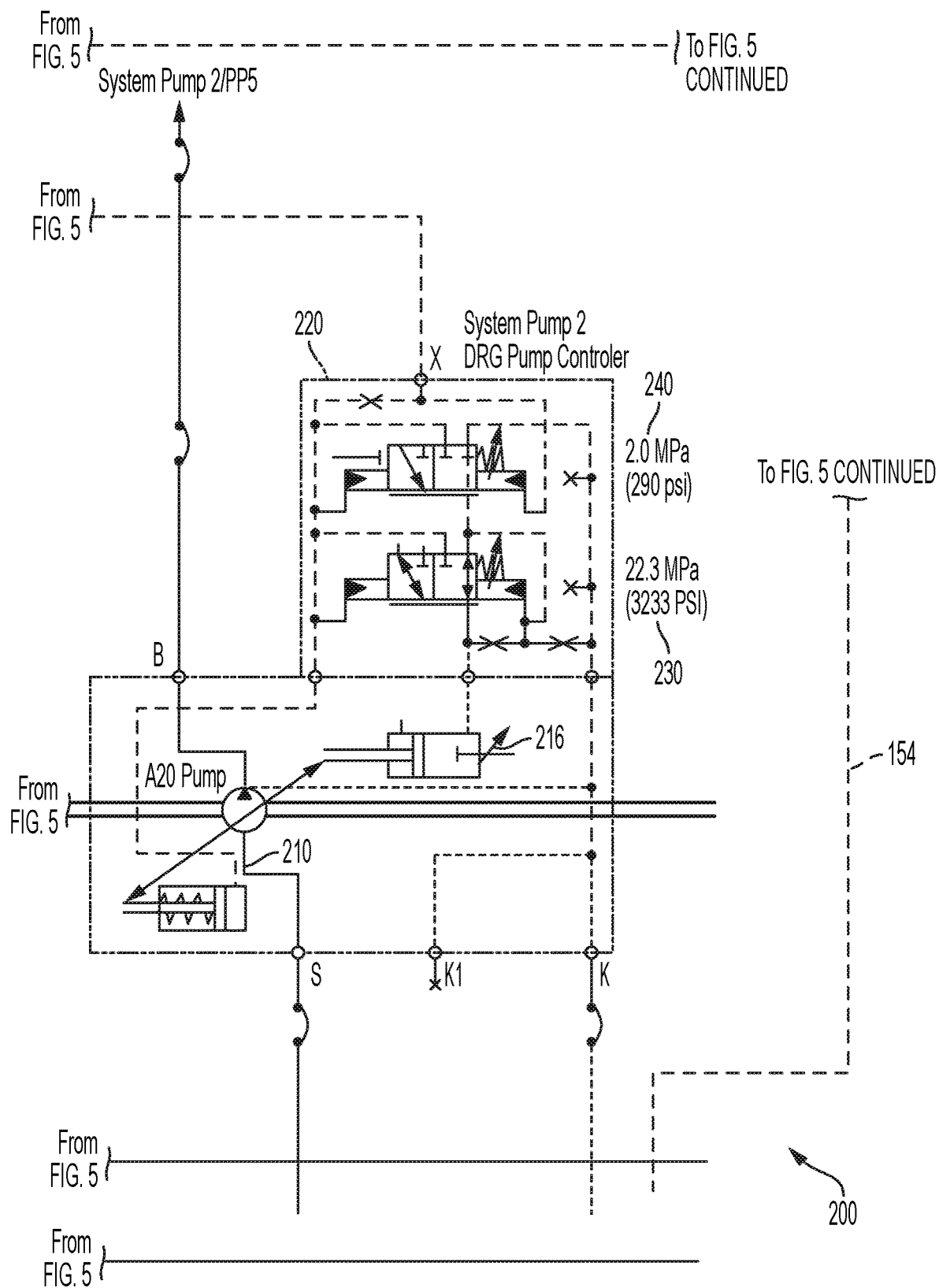
Figure 5:
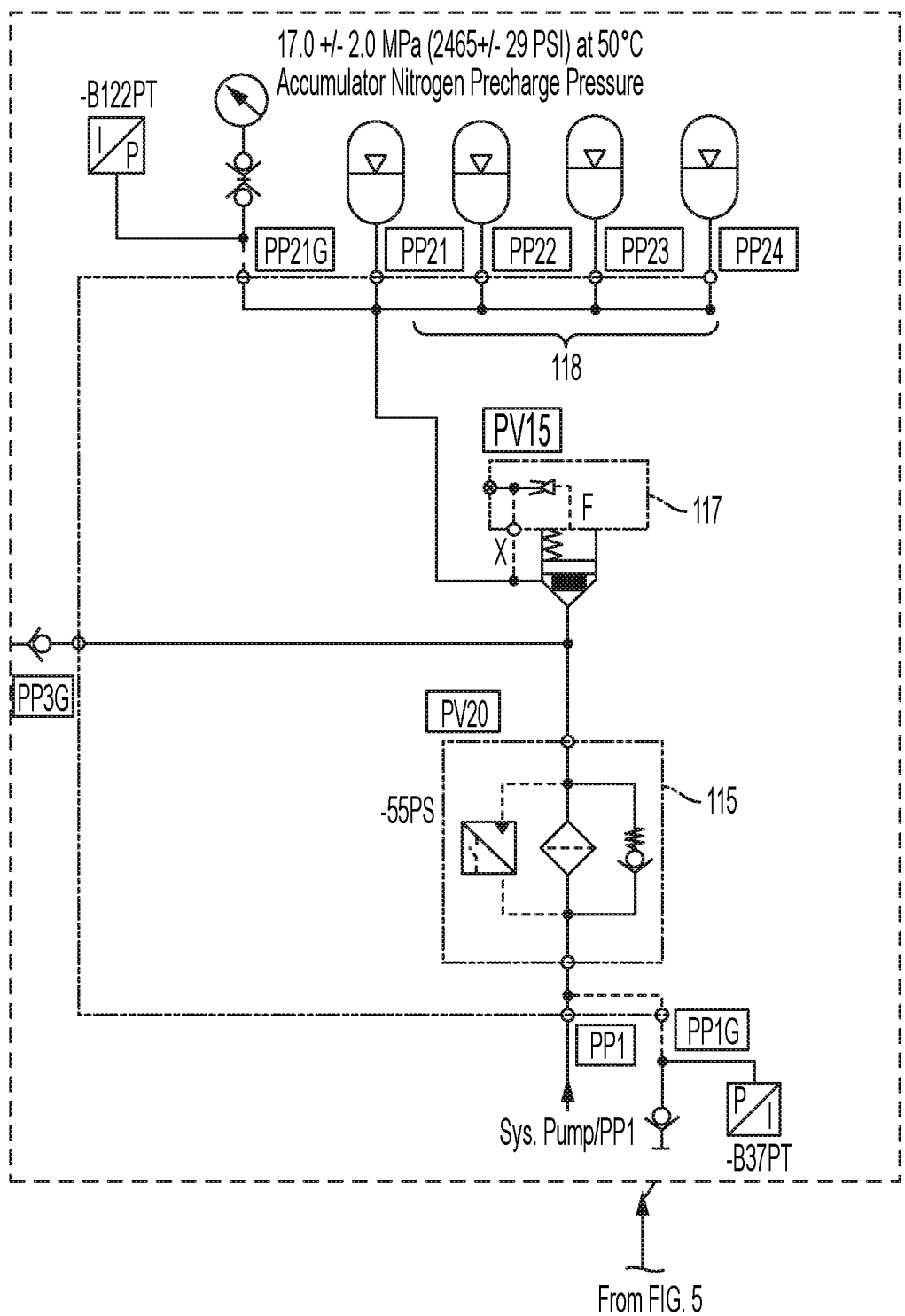
Figure 5:
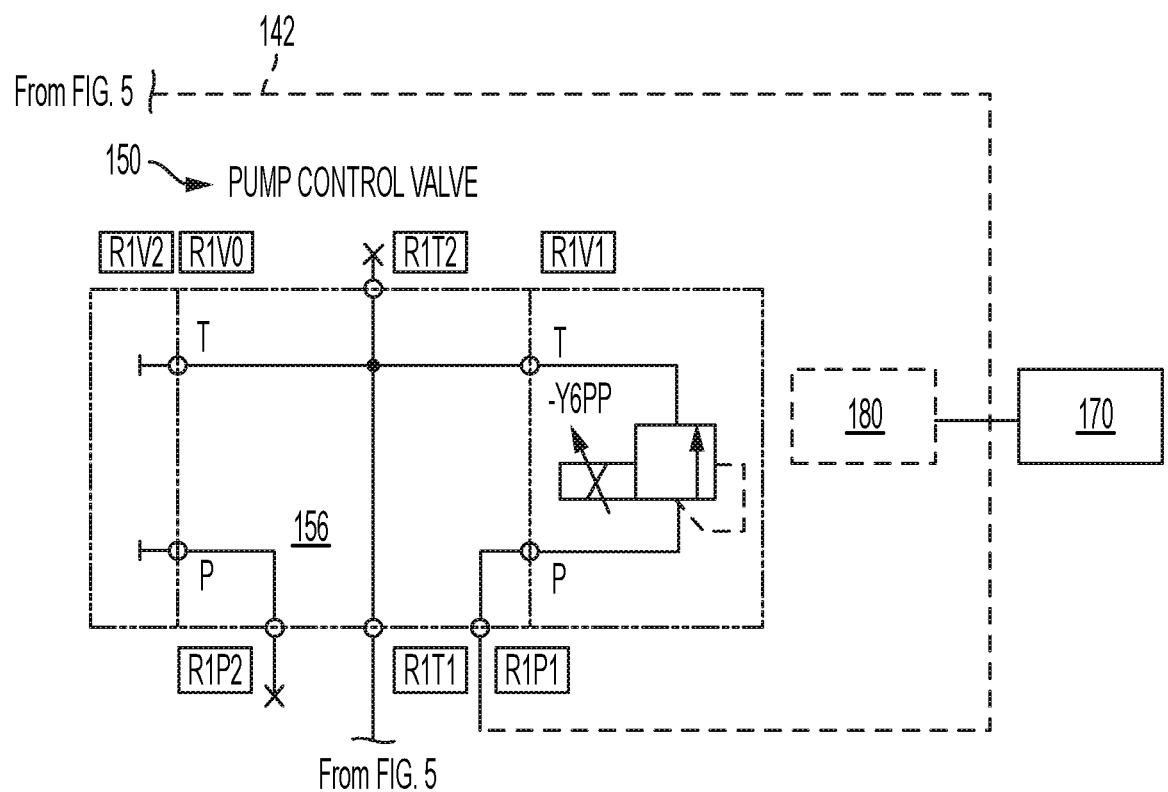

Referring now to FIG. 5, a schematic for a hydraulic circuit according to another embodiment is shown at 200. The hydraulic circuit 200 is configured to actuate one or more functions of the injection molding system 900. According to the example of FIG. 5, the hydraulic circuit 200 includes a first pump assembly 110, a first actuator assembly 116, a first pump compensator valve assembly 120, a second pump assembly 210, a second actuator assembly 216, a second pump compensator valve assembly 220, a motor assembly 112, a hydraulic fluid filter 115, an accumulator check valve 117, one or more accumulator assemblies 118, a proportional pump control valve 150, a reservoir 160, and a controller 170.

It will be appreciated that, in accordance with the teachings herein, the injection molding system 900 may also be adapted to utilize three pump assemblies working with the proportional pump control valve 150. In accordance with the teachings herein, the injection molding system 900 may also be adapted to utilize an even greater number of pump assemblies by increasing the size/output/capacity of the proportional pump control valve 150 or quantity of proportional pump control valves, to ensure enough hydraulic fluid can flow to the reservoir 160.

Figure 6:
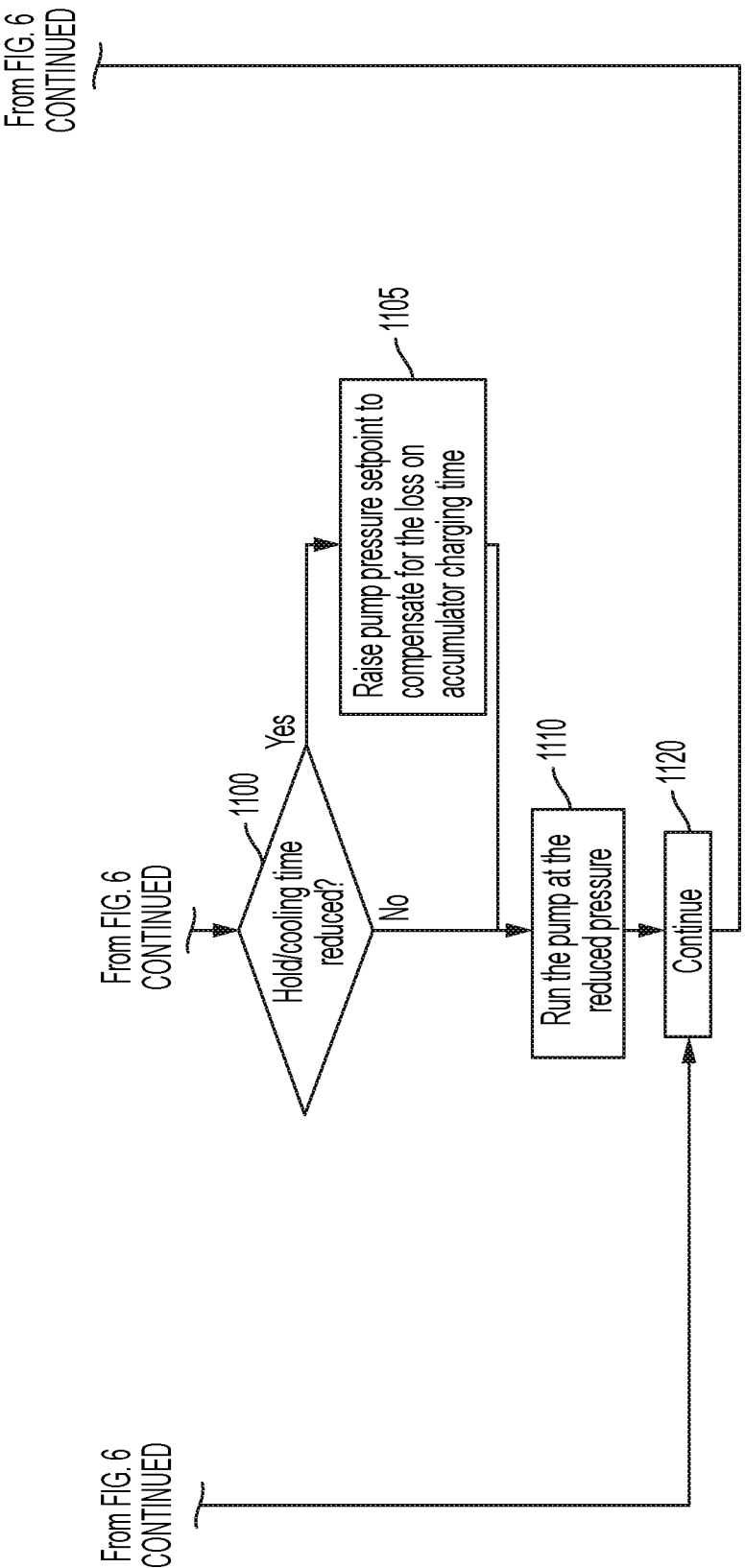
FIG. 6 depicts a flowchart of an example process of the controller on the hydraulic system.

Referring now to FIG. 6, a flowchart of an example process of the controller 170 on the molding system 900 is shown at 1000.

At step 1010, the controller 170 checks whether the injection molding system 900 is in production cycles. Production cycles are in contrast to other cycle modes such as dry cycle when the injection unit is not engaged and no parts are made even though mold are being closed and opened in each cycle. Dry cycle is sometimes called empty cycle. Production cycles are sometimes called normal cycles. For example, the injection molding system 900 may be deemed not in production cycles if it is in any of the following modes: idle, calibration, mold set, manual, dry cycle, factory test, semi, ejector boosters active, and mold vent cleaning cycles. If yes, the process 1000 moves to step 1020. If no, the process 1000 moves to step 1025. At step 1020, the controller 170 checks whether a predetermined number of baseline cycles have been completed. The first cycle after auto start is counted as 1, any subsequent cycle will increase the count by one. "Auto Start" means the start of production cycle mode. If the predefined number is 10, the predefined number of cycles are completed when the count reaches 10. As further discussed below, the baseline cycles may be performed both in connection with startup of the process 1000 and in further iterations of the process 1000 when restarting pressure adaptation. If yes, the process 1000 moves to step 1030. If no, the process 1000 moves to step 1025.

At step 1025, the pump assembly 110 operates for the predetermined number of baseline cycles at a predetermined standard pressure value. The so predetermined standard pressure is set by the controller 170 and needs to be in the range between the minimum limit set by valve 140 and maximum limit set by valve 130. In separate example embodiments, the predetermined number of baseline cycles is 10 cycles and 20 cycles, although a different predetermined number of baseline cycles may be selected in accordance with the present invention. The process 1000 then moves to step 1026.

At step 1026, the controller 170 determines and logs the baseline performance of the injection molding system 900. The baseline performance refers to one or more functions of the injection molding system 900, and can include the time durations of the following functions, among others: mold closing, mold opening, clamp-up, unclamp, and/or ejector-forward. The baseline performance is determined based on measurements from one or more sensors associated with the functions, such as transducers. Baseline performance in the current implementation is regarding motion time specifically, although it can expand to any other criteria. The process 1000 then moves to step 1120.

At step 1030, the controller 170 determines and sets a target pressure value. The target pressure value is less than the predetermined standard pressure value but not small enough to result in a deviation from the baseline performance determined at step 1026. In an example embodiment, the controller 170 sets the target pressure value to the highest value among the lower limits of pressure value imposed by one or more functions of the injection molding system 900. These functions may include, for example, the functions measured during step 1026. In an example embodiment, the lower limits of pressure value are determined using measurement and mathematical modeling. That is, for any given function, the lower limit of pressure value for that function can be determined based on measurement of its mechanical characteristics, mathematical modeling of its mechanical characteristics, or both, where the lower limit is the greater of the pressure value determined from the measurements or model. The mechanical characteristics of a function that can be measured include force, pressure, acceleration, and velocity, and physical characteristics associated with the function, including mass and area, can be used with the function's mechanical characteristics to determine its lower limit of pressure. Mathematical models can be used, for example, for functions that are sufficiently fast or dynamic so as to limit the accuracy of measurements, for the purpose of estimate the minimum pressure required to deliver performance of those functions. The process 1000 then moves to step 1040.

At step 1040, the controller 170 checks whether the pressure of the one or more accumulator assemblies 118 is lower than a predetermined accumulator pressure limit. In separate example embodiments, the predetermined accumulator pressure limit is 170 bar and 174 bar, although a different predetermined accumulator pressure limit may be selected in accordance with the present invention. If yes, the process 1000 moves to step 1045. If no, the process 1000 moves to step 1050.

At step 1045, the controller 170 increases the target pressure value by an amount equal to The difference between the pressure of the one or more accumulator assemblies 118 and the predetermined accumulator pressure limit. The process 1000 then moves to step 1050.

At step 1050, the controller 170 checks whether the cycle/function time duration is longer than the corresponding baseline time duration determined at step 1026. If yes, the process 1000 moves to step 1055. If no, the process 1000 moves to step 1060.

At step 1055, the controller 170 increases the target pressure value to the value of the setpoint before the most recent drop in step 1075. The process then moves to step 1060.

At step 1060, the controller 170 checks whether the target pressure value is greater than the variable pressure setpoint of the injection molding system 900. If yes, the process 1000 moves to step 1065. If no, the process moves to step 1070.

At step 1065, the controller 170 increases the variable pressure setpoint to the target pressure value. In an example embodiment, the controller 170 does so by causing the proportional pump control valve 150 to decrease the flowrate of hydraulic fluid to the reservoir 160. The process then moves to step 1080.

At step 1070, the controller 170 checks whether a predetermined number of stabilizing cycles have been completed since the most recent decrease in the variable pressure setpoint. For the purposes of step 1070, in the cycle immediately after the predetermined number of baseline cycles have been completed, the predetermined number of stabilizing cycles are deemed to have been completed since the most recent decrease in target pressure. Since the number of base line cycles is chosen to be larger than the number of stabilizing cycles, there is no need to repeat the number of stabilizing cycles immediately after the baseline cycles. In an example embodiment, the predetermined number of stabilizing cycles is 5 cycles, although a different predetermined number of stabilizing cycles may be selected in accordance with the present invention. If yes, the process 1000 moves to step 1075. If no, the process 1000 moves to step 1080.

At step 1075, the controller 170 decreases the variable pressure setpoint to a value approaching the target pressure value. In an example embodiment, the controller 170 does so by causing the proportional pump control valve 150 to increase the flowrate of hydraulic fluid to the reservoir 160. In an example embodiment, the decrease in the variable pressure setpoint is equal, or approximately equal, to a predetermined percentage of the difference between the variable pressure setpoint and the target pressure value. In an example embodiment, the decrease in the variable pressure setpoint is also limited such that it is within, or approximately within, a predetermined bound of pressure values. For example, the predetermined percentage may be 61.8%, and the predetermined bound may be 1 bar to 10 bar, inclusive, although a different predetermined percentage and/or predetermined bound of pressure values may be selected in accordance with the present invention. In this example, if the decrease in the variable pressure setpoint would be greater than the upper bound, it is limited to the upper bound, while if the decrease in the variable pressure setpoint would be less than the lower bound, it does not take place, and instead there is no change in the variable pressure setpoint. The process 1000 then moves to step 1080.

At step 1080, the controller 170 sets an updated value of the variable pressure setpoint, when applicable. The process 1000 then moves to step 1090.

At step 1090, the controller 170 checks whether relevant setpoints have been changed. As non-limiting examples, the relevant setpoints may be changeable by an operator of the injection molding system 900 and include but not limited the following setpoints: mold open position, mold closing speed, clamp tonnage, injection fill rate, etc. If yes, the process 1000 then moves to step 1095. If no, the process 1000 then moves to step 1100.

At step 1095, the controller 170 causes the injection molding system 900 to restart pressure adaptation and reestablish baseline performance. For example, it does so by treating the predetermined number of baseline cycles not to have been completed. The process 1000 then moves to step 1020.

At step 1100, the controller 170 checks whether the hold/cooling time has decreased. If yes, the process 1000 moves to step 1105. If no, the process 1000 moves to step 1110. Hold time and cooling time are user setpoints on HMI and the controller keeps tracking if they are changed by the user. The controller records the event, amount, and the direction (increase or decrease) of the change.

At step 1105, the controller 170 increases the variable pressure setpoint to compensate for the decrease in accumulator pressure charging time duration. Accumulator pressure charging typically occurs during the injection-hold and injection-cooling functions, in which oil consumption is at a minimum. If the accumulator charging time duration decreases, then the pressure of the one or more accumulator assemblies 118 will decrease and may be unable to support remaining functions of the current cycle, such as unclamp and mold-opening. In an example embodiment, the compensation for the decrease in accumulator charging time duration is performed using the accumulator pressure charging rate that is calibrated in a state of minimum oil consumption. For example, the state of minimum oil consumption can include the clamp-up and injection hold functions and exclude the transfer and packing functions. In an example embodiment, the controller 170 increases the variable pressure setpoint by causing the proportional pump control valve 150 to decrease the flowrate of hydraulic fluid to the reservoir 160. The process 1000 then moves to step 1110.

At step 1110, the pump assembly 110 operates at the reduced pressure. The process 1000 then moves to step 1120. At step 1110, the pump assembly 110 operates for all cycles except for those cycles or modes that are subject to conditions in 1025.

At step 1120, the process 1000 continues and moves to step 1010.

As exemplified by example process 1000, the injection molding system 900 can operate to adapt the system pressure of the injection molding system 900 based on one or more inputs of the system.

Figure 7:
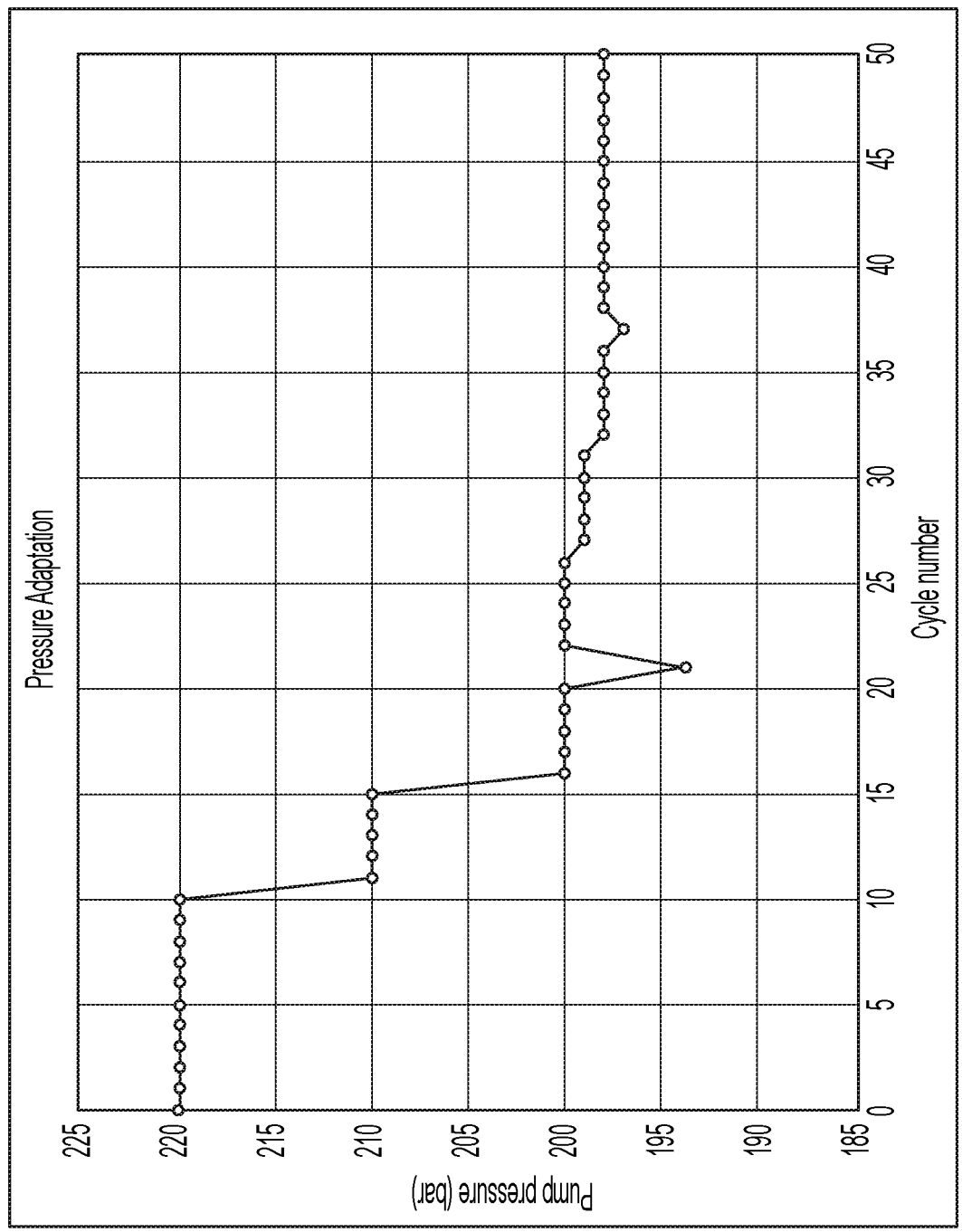
FIG. 7 depicts a graph showing the variable pressure setpoint value over number of completed cycles.

Referring now to FIG. 7, a graph of variable pressure setpoint over cycles in an example operation of the injection molding system 900 is shown at 600. In the graph 600, the y-axis is the variable pressure setpoint, measured in bar, and the x-axis is the number of completed cycles.

Prior to cycle 1, the variable pressure setpoint is approximately 220.0 bar. In an example embodiment performing the process 1000, this represents the predetermined standard pressure value. At the predetermined standard pressure value, the variable pressure setpoint is lower than the preset maximum pressure setpoint, which is 230 bar in the example.

From cycle 1 to cycle 10, the pump assembly 110 operates for 10 cycles at a variable pressure setpoint of approximately 220.0 bar. In an example embodiment performing the process 1000, this represents the process 1000 iterating through step 1025 for the predetermined number of baseline cycles—here, 10 cycles.

During cycle 11, the variable pressure setpoint is decreased to approximately 210.0 bar. In an example embodiment performing the process 1000, this represents the process 1000 now proceeding through step 1030 and step 1075 within a single iteration. More specifically, at step 1030, the target pressure value is set to a value that is less than the predetermined standard pressure value. At step 1070, the controller 170 determines that the predetermined number of baseline cycles was completed with cycle 10, so at step 1075, it decreases the variable pressure setpoint to a value—here, approximately 210.0 bar—approaching the target pressure value. From cycle 11 to cycle 15, the pump assembly 110 operates for 5 cycles at the variable pressure setpoint of approximately 210.0 bar. In an example embodiment performing the process 1000, this represents the process 1000 proceeding from step 1075 as discussed above through step 1110, then iterating for 4 more cycles proceeding directly through step 1070 and step 1080 and not step 1075, for a total that is the predetermined number of stabilizing cycles—here, 5 cycles. During cycle 16, the variable pressure setpoint is decreased to approximately 200.0 bar. In an example embodiment performing the process 1000, this represents the process 1000 again proceeding through step 1030 and step 1075 within a single iteration. At step 1070, the controller 170 determines that the predetermined number of stabilizing cycles was completed with cycle 15, so at step 1075, it decreases the variable pressure setpoint a value—here, approximately 200.0 bar—approaching the target pressure value.

From cycle 16 to cycle 20, the pump assembly 110 operates for 5 cycles at the variable pressure setpoint of approximately 200.0 bar. In an example embodiment performing the process 1000, this represents the process 1000 again proceeding from step 1075 as discussed above through step 1110, then iterating for 4 more cycles proceeding directly through step 1070 and step 1080 and not step 1075, for a total that is the predetermined number of stabilizing cycles.

During cycle 21, the variable pressure setpoint is decreased to approximately 193.8 bar. In an example embodiment performing the process 1000, this represents the process 1000 again proceeding through step 1030 and step 1075 within a single iteration. At step 1070, the controller 170 determines that the predetermined number of stabilizing cycles was completed with cycle 20, so at step 1075, it decreases the variable pressure setpoint a value—here, approximately 193.8 bar—approaching the target pressure value.

During cycle 22, the variable pressure setpoint is increased to approximately 200.0 bar, representing an increase equal to the decrease that took place during cycle 21. In an example embodiment performing the process 1000, this represents the process 1000 proceeding through either or both of step 1045 and step 1055, and then through step 1065, within a single iteration. As a more specific example, this represents the process 1000 proceeding through step 1050, at which the controller 170 determines that the most recently measured ejector-forward time duration is greater than the ejector-forward time duration that was determined during baseline performance. Accordingly, the process 1000 proceeds directly through step 1055 and increases the target pressure value by an amount equal to the previous decrease. Within the same iteration, the process 1000 then proceeds through step 1060, where the controller 170 determines that the target pressure value is greater than the variable pressure setpoint, and then directly through step 1065, where the controller 170 increases the variable pressure setpoint to the target pressure value—here, approximately 200.0 bar. The target pressure is 190 bar in cycle 20, remains at 190 bar in cycle 21. At the end of cycle 21 and before starting cycle 22, the control detected an increase of cycle time or function step time, it rolled the pressure back to 200 bar by undoing the previous pressure drop. At the same time, the control also changes the target pressure to be the same as the pressure setpoint, 200 bar in this case. From cycle 22 to 26, since the cycle time is not affected due to higher pressure (200 bar) than the pressure used in cycle 21 (193.8 bar), the algorithm doesn't go through step 1055. The target pressure that is determined in step 1030 by the model remains at 190 bar (not revised higher). Due to another criteria that kicks in when step 1055 is triggered by the condition in 1050, the pressure drop described in step 1075 is limited by a small value of 1 bar. Note that in cycle 37, the cycle time is impacted again and the algorithm trigged step 1055 the second time. It is in this instance that the target pressure settles at 198 bar. From cycle 22 to cycle 42, the injection molding system 900 operates with similar behavior to that of cycle 10 to cycle 22 discussed above. In an example embodiment performing the process 1000, this represents the process 1000 proceeding through iterations of stabilizing cycles, one-cycle decreases in variable pressure setpoint, and a one-cycle increase in variable pressure setpoint offsetting the previous decrease.

During cycle 42, the variable pressure setpoint has essentially converged to the target pressure value. In an example embodiment performing the process 1000, this represents the process 1000 proceeding through step 1075, where the variable pressure setpoint is either equal or close enough to the target pressure value or that it does not decrease at step 1075. In an example embodiment where the minimum decrease in target pressure value must be approximately 1 bar, the variable pressure setpoint can be within 1 bar above the target pressure value.

After cycle 42, the pump assembly 110 operates for an indefinite number of cycles at the stabilized variable pressure setpoint—here, approximately 198.0 bar. In an example embodiment performing the process 1000, this will continue until an event causes a change in target pressure. The graph 600 thus demonstrates how, in one aspect of the present invention, decreases in the variable pressure setpoint gradually stabilize to an optimal value.

It is to be understood that the present invention is not limited to the disclosed example embodiments described above. The present invention is intended to cover various modifications and equivalent arrangements, such as are included within the scope of the claims. It may be appreciated that the embodiments, systems, components, and other items described above may be connected with each other as may be required to perform desired functions and tasks that are with the scope of persons of ordinary skill in the art to make such combinations and permutations without having to describe each and every one of them in explicit terms.

What is claimed is:

1. A method for controlling an injection molding system to optimize an efficiency of the injection molding system, wherein the injection molding system includes a pump assembly, a system pressure and at least one component pressure, the method comprising:
   (a) controlling the pump assembly to allow for operation of the injection molding system at a predetermined first system pressure set by a controller for a predetermined number of baseline cycles;
   (b) measuring a baseline performance of the injection molding system with one or more sensors during the baseline cycles;
   (c) comparing an accumulator pressure with an accumulator pressure limit;
   (d) based on the baseline performance and the accumulator pressure, setting a second system pressure value as a target pressure value;
   (e) setting a variable pressure setpoint equal to a third system pressure value;
   (f) comparing the variable pressure setpoint to the target pressure value; and
   (g) controlling the pump assembly to change the variable pressure setpoint to a value approaching the target pressure value, wherein an amount of change is determined based on a difference between the variable pressure setpoint and the target pressure value.

2. The method of claim 1, further comprising repeating functions (a)-(f).

3. The method of claim 1, further comprising logging the baseline performance of the injection molding system.

4. The method of claim 1, wherein the setting of the second system pressure value comprises setting the target pressure value to a highest value among lower limits of pressure imposed by one or more functions of the injection molding system.

5. The method of claim 4, further comprising mathematically modelling a mechanical characteristic of a function of the injection molding system to determine a lower limit of pressure necessary for the injection molding system to perform the function of the injection molding system.

6. The method of claim 5, wherein the mechanical characteristic includes at least one of: force, pressure, acceleration, and velocity.

7. The method of claim 1, wherein the target pressure value is set to the second system pressure value as determined from a mathematical model of one or more functions of the injection molding system.

8. The method of claim 1, wherein the baseline performance includes time duration performance data for one or more system functions.

9. The method of claim 8, wherein the one or more system functions include a corresponding one of mold closing, mold opening, clamp-up, unclamp, and ejector-forward.

10. The method of claim 1, further comprising raising the target pressure value to the third system pressure value if the target pressure value is less than the variable pressure setpoint.

11. The method of claim 1, further comprising:
measuring a time duration of one or more system functions; and
comparing the time duration of the one or more system functions to the measured baseline performance.

12. The method of claim 11, further comprising raising the variable pressure setpoint to the second system pressure value if the target pressure value is greater than the variable pressure setpoint and if the measured time duration of one or more system functions is longer than the baseline performance.

13. The method of claim 11, further comprising decreasing the variable pressure setpoint to a fourth system pressure value if the target pressure value is not greater than the variable pressure setpoint and if the measured time duration on one or more system functions is not longer than the baseline performance, and wherein the fourth system pressure value is between the second system pressure value and the third system pressure value and the fourth system pressure value approaches the target pressure value.

14. The method of claim 13, wherein the decrease in the variable pressure setpoint is equal to a predetermined percentage of a difference in values of the variable pressure setpoint and the target pressure value.

15. The method of claim 1, wherein the variable pressure setpoint is limited to be below a predetermined upper bound and to be above a predetermined lower bound.

16. The method of claim 1, further comprising increasing the variable pressure setpoint to a fifth system pressure value to compensate for a decrease in duration available for accumulator pressure charging.

17. The method of claim 1, wherein the target pressure value is determined and set by a controller.

18. The method of claim 5, wherein a controller sets the target pressure value based at least in part on a result of the mathematical model.

19. The method of claim 1, wherein a controller sets the target pressure value determined based at least in part on a measurement of a function of the injection molding system.

20. The method of claim 1, further comprising:
operating the injection molding system with a pump, the pump operating at a pressure reduced from a pressure used in the baseline cycles; and
adapting a system pressure of the injection molding system based on one or more inputs of the injection molding system in functions (a)-(f).

21. The method of claim 1, wherein the third system pressure value is set by a controller.

22. The method of claim 1, wherein the third system pressure value is equal to the accumulator pressure limit.

23. The method of claim 1, wherein the change of the variable pressure setpoint comprises increasing the variable pressure setpoint by an amount equal to a difference between the accumulator pressure and the accumulator pressure limit.

* * * * *